(12) United States Patent
Hoshino et al.

(10) Patent No.: US 12,000,469 B1
(45) Date of Patent: Jun. 4, 2024

(54) ELECTRONICALLY CONTROLLED LIMITED-SLIP DIFFERENTIAL

(71) Applicant: GKN Automotive Limited, Birmingham (GB)

(72) Inventors: Masato Hoshino, Tochigi (JP); Ryuya Saito, Tochigi (JP); Takahiro Nagaoka, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/531,866

(22) Filed: Dec. 7, 2023

(30) Foreign Application Priority Data

Sep. 11, 2023 (JP) .................................. 2023-146864

(51) Int. Cl.
*F16H 48/34* (2012.01)
*F16H 48/08* (2006.01)
*F16H 48/22* (2006.01)
*F16H 48/20* (2012.01)

(52) U.S. Cl.
CPC ............ *F16H 48/34* (2013.01); *F16H 48/08* (2013.01); *F16H 48/22* (2013.01); *F16H 2048/207* (2013.01)

(58) Field of Classification Search
CPC .......... F16H 48/34; F16H 48/08; F16H 48/22; F16H 2048/207
See application file for complete search history.

(56) References Cited

U.S. PATENT DOCUMENTS

| | | | |
|---|---|---|---|
| 11,254,207 B2 * | 2/2022 | Edler | F16H 48/22 |
| 11,378,167 B2 * | 7/2022 | Dumas | B60K 17/165 |
| 2017/0089439 A1 * | 3/2017 | Monticello | F16H 48/22 |

FOREIGN PATENT DOCUMENTS

| | | | | |
|---|---|---|---|---|
| EP | 1884395 A1 * | 2/2008 | ........... | B60K 28/165 |
| JP | 2003329105 A | 11/2003 | | |
| JP | 2006183784 A | 7/2006 | | |

\* cited by examiner

*Primary Examiner* — Justin Holmes
(74) *Attorney, Agent, or Firm* — Bejin Bieneman PLC (57) ABSTRACT

A differential is provided with: a torque receiving casing; a differential gear set having first and second side gears to differentially distribute torque to the first and second side gears; a clutch interposed between the casing and the first side gear and configured to exert a frictional braking force on the first side gear against the casing to limit a differential motion between the first side gear and the second side gear; an actuator configured to apply a pressing force to the clutch to control the differential motion; and an electronic control unit configured to calculate a demand torque value from the input torque, compare the wheel load with a threshold value to determine a correction value, make a correction in the demand torque value by the correction value to obtain a demand value, and control an electric power supplied to the actuator in response to the demand value.

6 Claims, 10 Drawing Sheets

ELECTRONICALLY CONTROLLED LIMITED-SLIP DIFFERENTIAL

CROSS-REFERENCE TO RELATED APPLICATIONS

This application is based upon and claims the benefit of priority from Japanese Patent Application No. 2023-146864 (filed Sep. 11, 2023), the entire contents of which are incorporated herein by reference.

BACKGROUND

A device referred to as a limited-slip differential (LSD) is often used in a vehicle to absorb differential motion between right and left driving wheels and, even when one of the driving wheels loses traction, enable torque output to another. That which uses tangible mechanisms for limiting differential motion is sometimes referred to as a mechanical LSD, while that which uses any electronic devices is sometimes referred to as an electronically controlled LSD.

In the electronically controlled LSD, some additional parameters may be used to optimize slip-limitation force. Japanese Patent Application Laid-open No. 2006-183784, for example, discloses using a torque-bias-ratio and a lateral acceleration rate created in a vehicle to control the slip-limitation force. Japanese Patent Application Laid-open No. 2003-329105 discloses calculating a power to be applied in advance (initial torque).

SUMMARY

The aforementioned systems assume various parameters about a vehicle when used. More specifically, while it is natural to know predetermined parameters such as a weight and a wheel base of the vehicle, it is further required to assume parameters that are changeable in actual use, such as average weights of, and the number of, passengers, and a weight of luggage on its trunk. If the assumption is close to the actual state of the vehicle, the LSD may behave in a desired manner. The vehicle may, however, carry heavier luggage than assumed, or climbing and downhill may markedly change distribution of the weight onto front and rear wheels. A traction force may weigh heavily in some case, for example in a case where one vehicle pulls another. Unfavorable behaviors may not be avoided where an actual condition of the vehicle deviates from the condition assumed at design time.

The disclosure herein to relates an electronically controlled limited-slip differential, including an electronically controlled limited-slip differential that can change properties depending on wheel loads. According to an aspect, a differential to be used for distributing an input torque to a pair of output shafts depending at least on the input torque and a wheel load is provided with: a casing receiving the input torque; a differential gear set housed in and supported by the casing, the differential gear set including first and second side gears respectively connected to the output shafts to differentially distribute the input torque to the first and second side gears; a clutch interposed between the casing and the first side gear and configured to exert a frictional braking force on the first side gear against the casing to limit a differential motion between the first side gear and the second side gear; an actuator configured to apply a pressing force to the clutch to control the differential motion; and an electronic control unit electrically connected to the actuator and including a storage device storing at least one threshold value, the electronic control unit configured to calculate a demand torque value from the input torque, compare the wheel load with the threshold value to determine a correction value, make a correction in the demand torque value by the correction value to obtain a demand value, and control an electric power supplied to the actuator in response to the demand value.

DESCRIPTION

Exemplary embodiments will be described hereinafter with reference to the appended drawings.

Figure 3A:
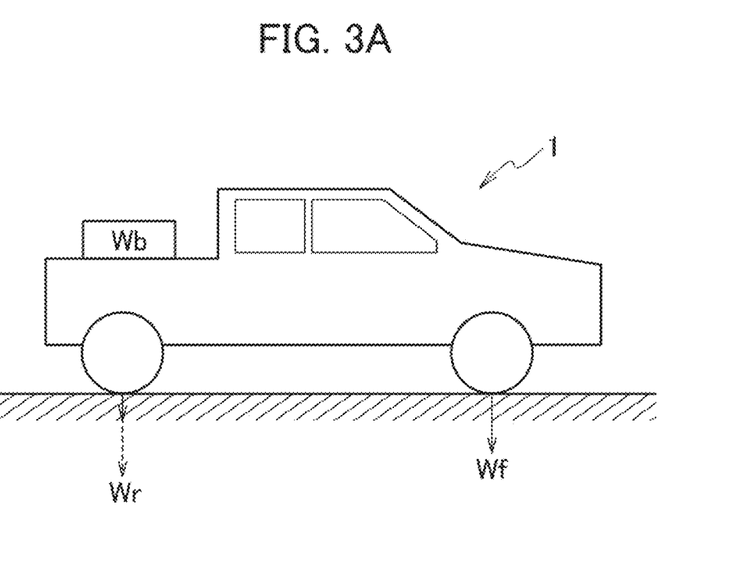
FIG. 3A is a schematic drawing showing a vehicle and wheel loads.
Figure 3B:
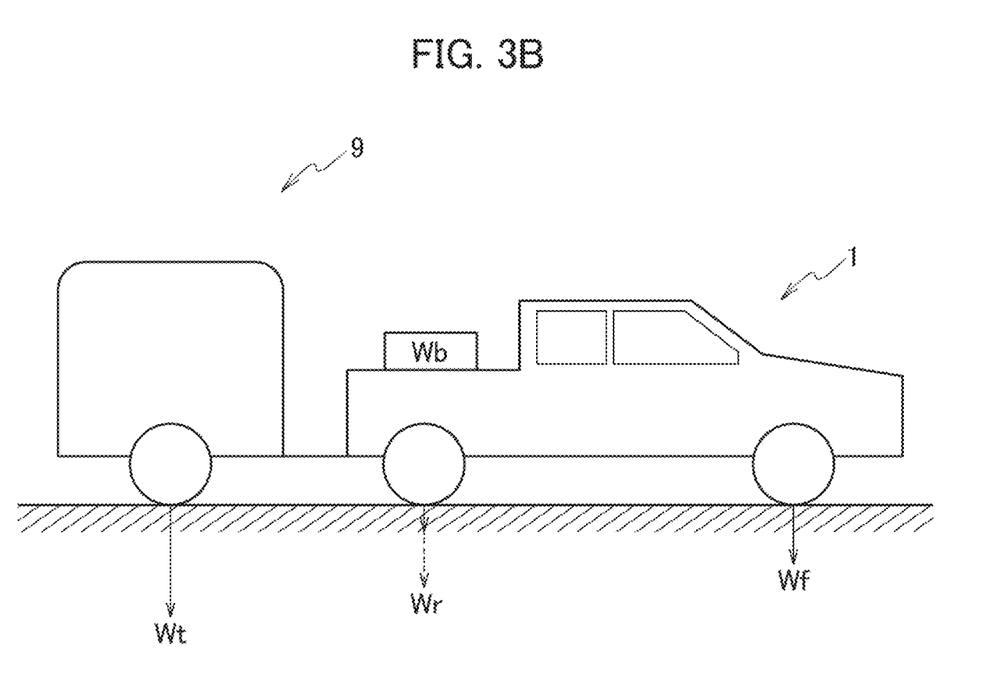
FIG. 3B is a schematic drawing of a vehicle with another vehicle drawn thereby.

Referring to FIG. 3A, an engine or a motor accounts for large part of vehicle weight, and may be, in many cases, mounted on a front portion of a vehicle 1. Its front wheel load Wf is thus greater in some degree than its rear wheel load (indicated by the solid arrow) Wr generally. In the prior art, behaviors of a differential is optimized based on this weight balance. The vehicle 1 is, however, not necessarily unloaded but may be loaded with heavy luggage on its back. Then, as its weight Wb is added, the rear wheel load Wr may become unignorably greater (indicated by the dashed arrow). This difference could be notable in particular in types of vehicle such as pickup tracks. Or, the vehicle 1 may, as in an example shown in FIG. 3B, draw another vehicle 9 such as a camper. In this case, the rear wheel load Wr may become further greater. The disclosure hereinafter relates to a device or a system for achieving an optimum slip-limitation force in any of various vehicle conditions.

Figure 1:
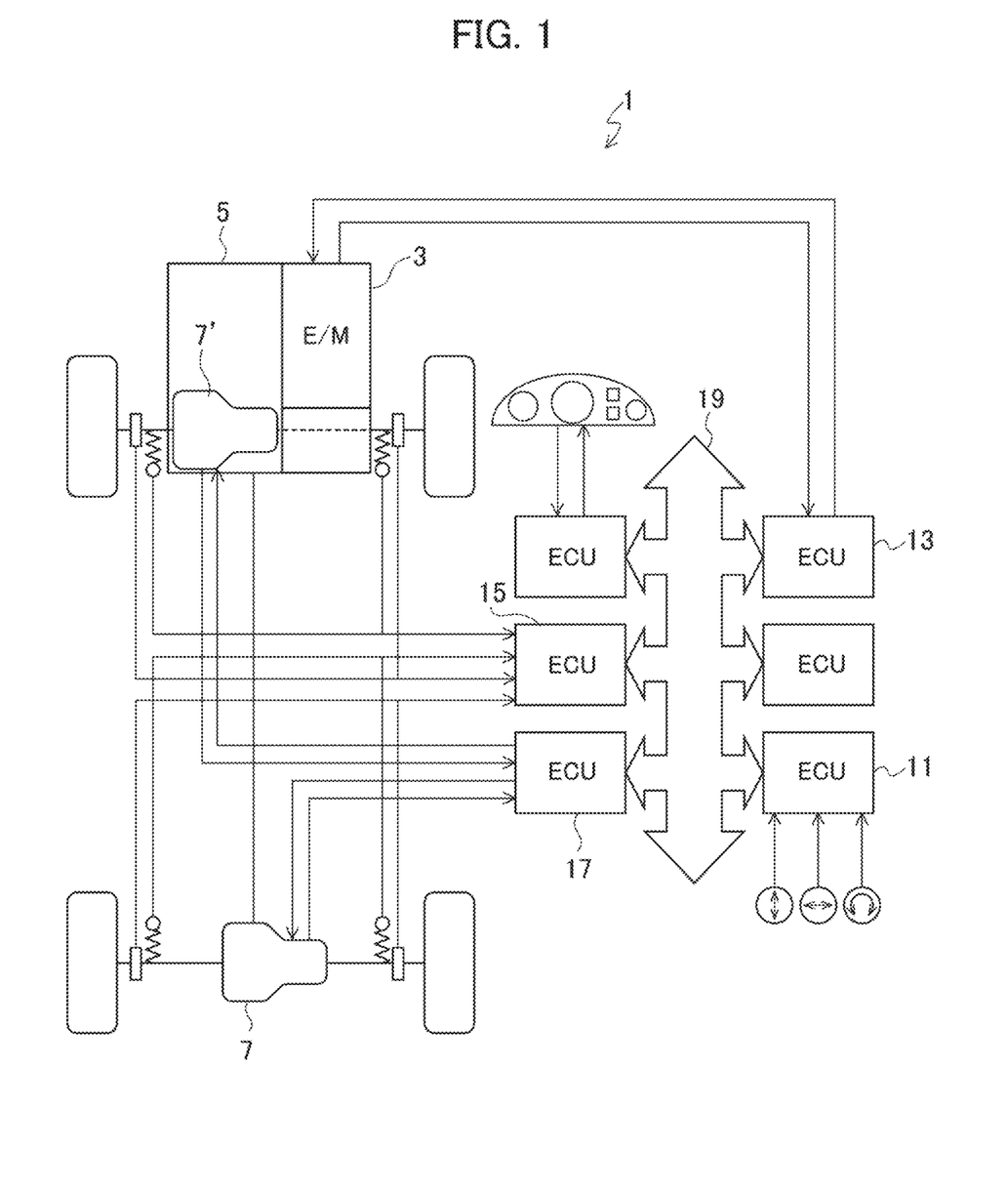
FIG. 1 is a block diagram of a vehicle including a differential of the present embodiment.

Referring to FIG. 1, a general vehicle 1 is provided with a power source 3 constituted of an engine and/or a motor and a gear system containing a transmission 5 that transmits torque from the power source 3 to the respective axles, and is further provided with a plurality of programmable electronic control units (ECUs) for electronically controlling these respective parts.

Figure 2:
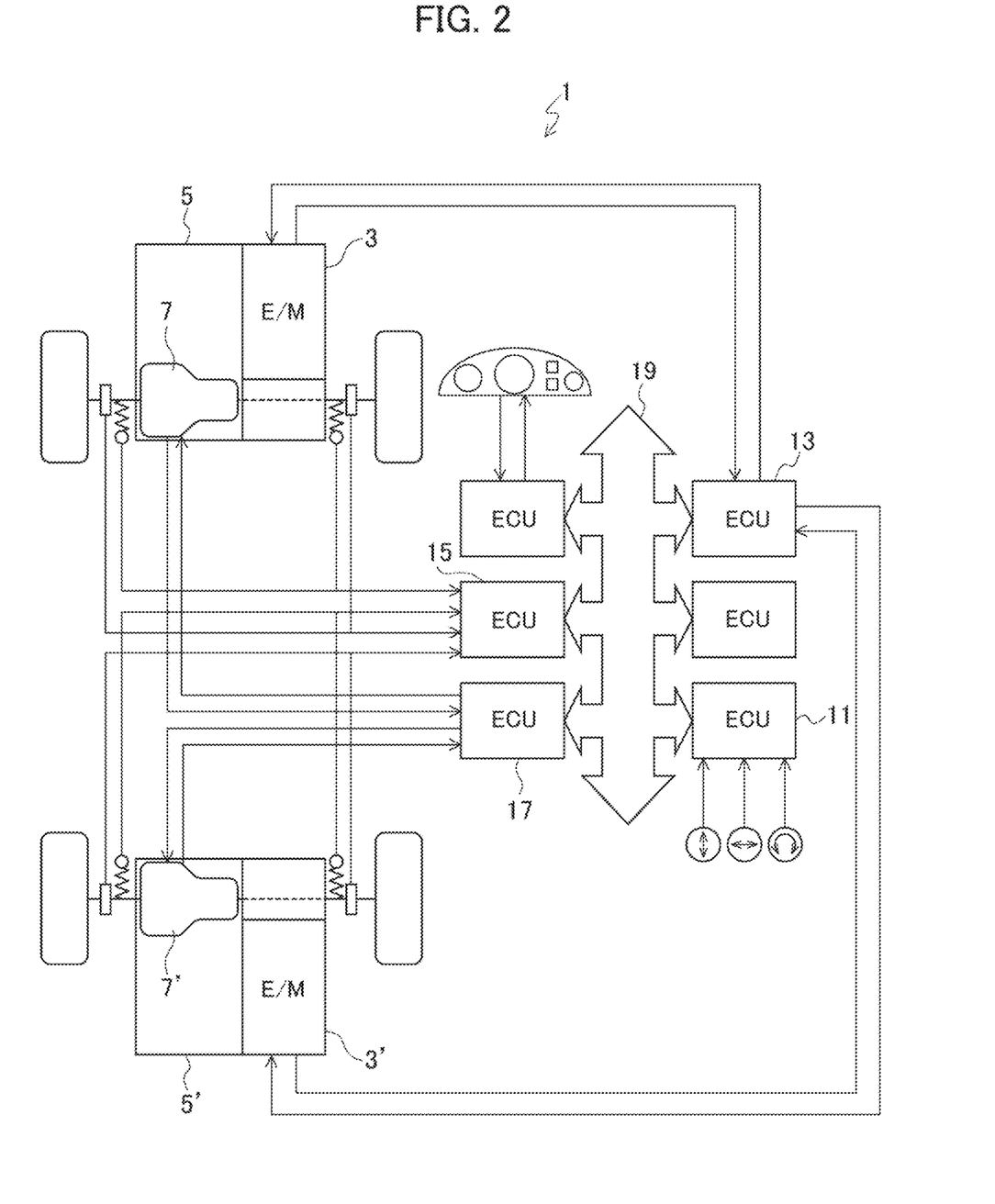
FIG. 2 is a block diagram of a vehicle, both front and rear wheels of which have independent power sources.

Torque is extracted and input from the power source 3 through the transmission 5 to the differential 7 and is thereby distributed to both the driving wheels. In the example shown in FIG. 1, the power source 3 is mounted on the front of the vehicle 1 and the rear wheels are driving wheels, whereas of course the power source 3 may be mounted on the rear and, in either case, the front wheels may be driving wheels. In a case where the front wheels are used as the driving wheels, needless to say, the front wheels have a differential 7'. The present embodiment may be, as well, applied to a four-wheel-drive (or all-wheel-drive) vehicle in which both the front and rear wheels are used as driving wheels. Still alternatively, to embody the four-wheel-drive (or all-wheel-drive) vehicle, as shown in FIG. 2, for not only driving the front wheels but also driving the rear wheels, another set of a power source 3', a transmission 5 and a differential 7' may be mounted and the front and rear wheels may be thereby driven independently. The present embodiment may be applied to any of these aspects.

Each ECU is provided with a storage device for storing commands and data and a microcontroller for reading out and executing the commands from the storage device. While the number of ECUs on a general vehicle may reach several tens or more, FIGS. 1 and 2 show only six ECUs among them. These ECUs 11-17 are mutually connected through a bus 19 and mutually exchange or own in common information via communication using a so-called controlled area network (CAN) for example.

The respective ECUs, with information in common with the other ECUs, control respective parts of the vehicle. The ECU 11 for example may be connected with various acceleration sensors to read out longitudinal acceleration, lateral acceleration and yaw acceleration acting on the vehicle. The ECU 13 may read out, and as well control, torque generated by the power source 3. The ECU 15 may be connected with sensors for reading out loads and angular speeds to read out the loads on and the angular speeds of the respective axles. The ECU 17 controls the differentials 7, 7'. The read out information may be received via the CAN communication through the bus 19 and may be utilized for controls by the other ECUs, and as well one ECU may send requests to the other ECUs.

Figure 4:
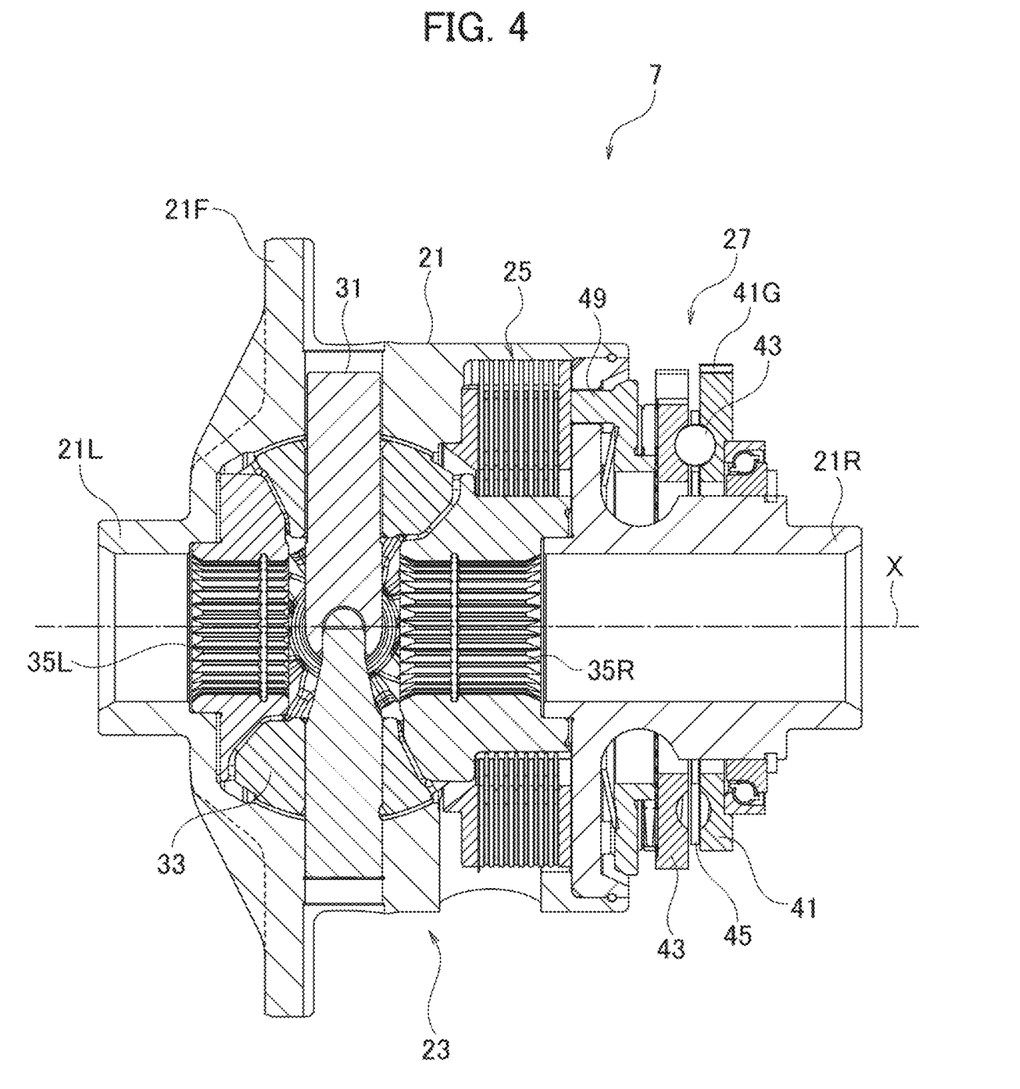
FIG. 4 is a sectional elevational view of a differential.

Referring to FIG. 4, to the differential 7 applicable is a generally available electronically controlled limited-slip differential (LSD). Specifically, the differential 7 is, while it is no more than an example, provided with a casing 21 rotatable about an axis X, a differential gear set 23 housed in the casing 21, a frictional clutch 25 for limiting differential motion of the differential gear set 23, and an actuator 27 for controllably applying a pressing force to the clutch 25. The ECU 17 serves for controlling the actuator 27. The ECU 17 may be dedicated or assigned to control of the actuator 27.

Although the following descriptions generally relate to an example where a bevel-gear differential gear set is applied to the differential 7, instead a face-gear type, a planetary gear type, or any other type may be used of course. Further, although in the example a multi-plate clutch is applied to the frictional clutch, instead a cone clutch or any other type may be used. Moreover, while the descriptions relate to a gear-cam actuator driven by an external motor, the motor may be built in the actuator to directly drive a rotary plate without intervening gears, or a hydraulic device could be used to generate a thrust force without using a cam mechanism, or any other type may be instead used.

From both ends of the casing 21, boss portions 21R and 21L axially project and are respectively supported by a carrier via bearings such as ball-bearings, thereby the casing 21 is rotatable about the axis X. A flange 21F radially expands from the outer periphery of the casing 21 and a ring gear for example is fixed thereto. An end section of a propeller shaft is provided with a gear corresponding to the ring gear and both these gears are mutually in mesh so that the casing 21 receives torque from the power source 3.

The differential gear set 23 is for example provided with a pinion shaft 31 fixed to the casing 21, pinions 33 rotatable about the shaft, and side gears 35R, 35L respectively engaged with the pinions 33. Each side gear 35R, 35L on its internal periphery has splines, for example, to connect with each output shaft. The output shafts are in general right and left axles. As will be readily understood, the side gears 35R, 35L are allowed to rotate in differential speeds and therefore the differential gear set 23 distributes torque that the casing 21 receives to the side gears 35R, 35L and outputs it to both axles with allowing differential motion.

The clutch 25 is a multi-plate clutch interposed between the casing 21 and the right side gear 35R for example, which is provided with a group of alternately layered inner plates and outer plates. The right side gear 35R is provided with lugs for engaging with the inner plates and the inner plates are provided with corresponding slots, thereby mutually being in mesh. Similarly the internal periphery of the casing 21 is provided with lugs and the outer plates are in mesh with the casing 21. When the actuator 27 applies pressing force to the group of plates, the clutch 25 exerts a frictional braking force on the right side gear 35R against the casing 21, thereby limiting differential motion between the side gears 35R, 35L. Needless to say, the clutch 25 may exert a braking force on the left side gear 35L in place of the right side gear 35R.

The actuator 27 is, for example, provided with a rotary plate 41, a support plate 43 and a cam mechanism 45 interposed therebetween to create a thrust force. The rotary plate 41 is rotatable about the axis X for example and is provided with gear teeth 41G around its outer periphery. Although not shown in FIG. 4, the actuator 27 is further provided with a motor for driving itself and, as the shaft is in mesh with the gear teeth 41G, rotates the rotary plate 41. The support plate 43 adjoins the rotary plate 41 and has a structure for anti-rotation, which engages with the carrier to prevent rotation. The cam mechanism 45 is for example provided with cam slopes formed on the plate 41 or 43 or both, and cam balls rolling over these slopes. When the rotary plate 41 rotates relative to the support plate 43, the cam balls roll over and then go up or down the slopes, thereby the cam mechanism 45 converts the rotative force into the thrust force.

The actuator 27 is disposed so close to the clutch 25 as to exert this thrust force on the clutch 25 and is also close to the end wall of the casing 21. The actuator 27 may be further provided with a plunger 49 for outputting the thrust force and the plunger 49 passes through the end wall of the casing 21 to contact the clutch 25. The actuator 27 thereby exerts the thrust force corresponding to the angle of rotation caused by the motor on the clutch 25.

Needless to say, the cam mechanism may be made other than by the cam balls and any structure that converts a rotative force into a thrust force is available. Further, although the example shown in the drawings relates to a structure where the support plate 43 exerts the thrust force, the rotary plate 41 may instead exert the thrust force.

The actuator 27 as structured in a way as described above creates a thrust force in accordance with the angle of rotation of the rotary plate 41 and the created thrust force acts on the clutch 25. Typically as the angle of rotation increases from the initial position, the thrust force accordingly increases and therefore a ratio of the torque transmitted to the side gears 35R, 35L via the clutch 25 increases while a transmission ratio via the gear set 23 decreases. On the other hand, if the angle of rotation of the rotary plate 41 decreases, the ratio via the clutch 25 decreases while the ratio via the gear set 23 increases.

The ECU 17 utilizes received data from the vehicle communication bus and the data stored in the storage device in advance to calculate a demand torque value $T_{req}$ and, based thereon, controls the actuator 27 to dynamically control a clutch torque.

Figure 5:
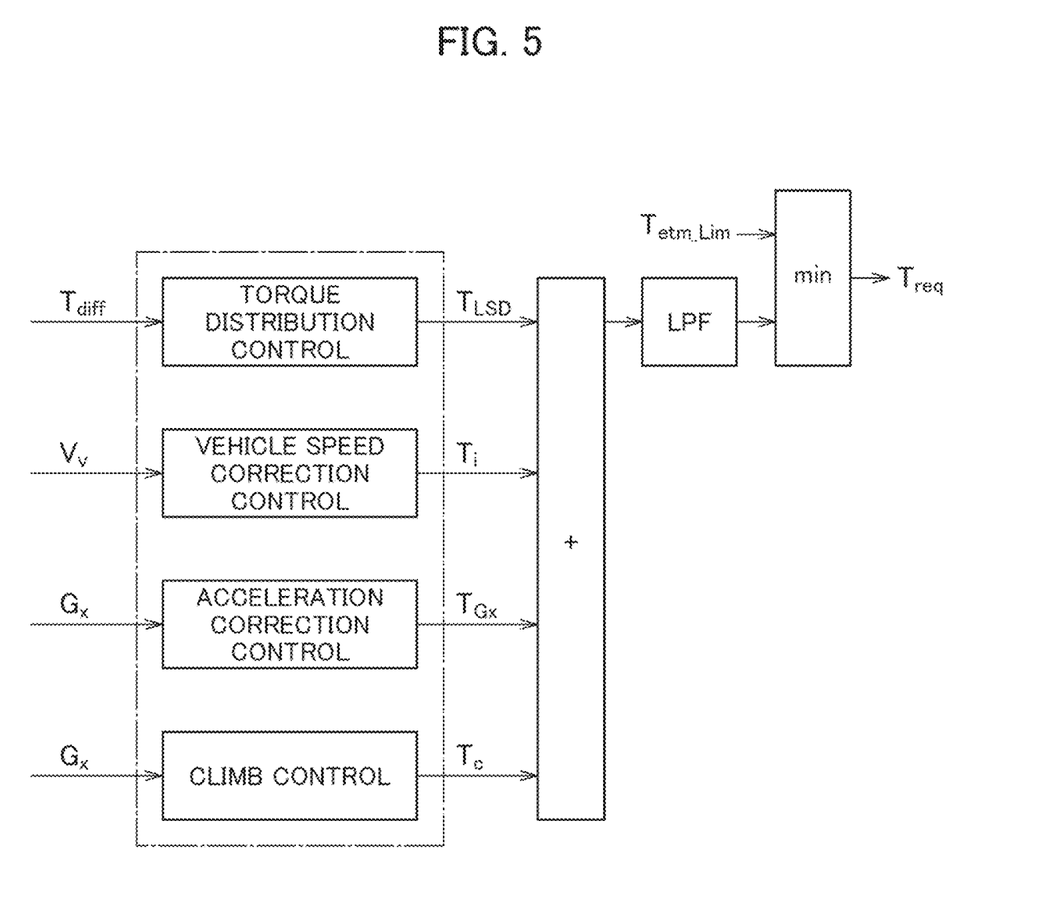
FIG. 5 is a diagram schematically showing a calculation made by an electronic control unit.

Referring mainly to FIG. 5, the ECU 17 is notified of the torque $T_{diff}$ input into the differential 7 via the communication bus. The ECU 17, on the basis of a differential torque ratio (or "torque bias ratio"; TBR) for example, calculates a lock ratio $f_{LSD}$ required for realizing a targeted TBR, and calculates a clutch torque $T_{LSD}$ by using a formula $T_{diff} \cdot f_{LSD}$ for example. The TBR may be in advance stored in the storage device of the ECU 17. Distinct TBRs depending on forward and reverse directions may be used, and one example of such sets is, although not limited to, that the forward TBR=2.7 and the reverse TBR=2.3.

The ECU 17 may further make a correction to the clutch torque $T_{LSD}$ by using another parameter and, on the basis of the corrected demand torque value $T_{reg}$, regulate the slip-limitation force. The demand value may be corrected by considering a slip-limitation force to be initially applied (initial torque) for example. The initial torque $T_i$ may be stored in the storage device of the ECU 17 in advance or may be calculated from a vehicle speed $V_v$ or any such parameters. As illustrated by a polygonal line in FIG. 9A, when the vehicle speed $V_v$ is relatively low, the initial torque $T_i$ may be relatively decreased to emphasize enablement of differential motion between the right and left wheels (or turning performance). When the vehicle speed $V_v$ is relatively high, however, the initial torque $T_i$ may be relatively increased to emphasize slip limitation. Thus an optimum slip limitation can be realized in accordance with an expected grip by tires.

In regard to calculation of the initial torque $T_i$, a data table for interrelating vehicle speeds $V_v$ and initial torques $T_i$ is stored in advance in the storage device of the ECU 17 and may be read out therefrom to carry out comparison with the actual vehicle speed $V_v$ to determine the initial torque $T_i$. Or, any formula provided in advance may be used for the calculation. As shown as an example in FIG. 5, it is possible to make a correction to the demand torque value $T_{req}$ by adding the initial torque $T_i$ to the clutch torque $T_{LSD}$, or use any larger value as the demand torque value $T_{req}$.

Referring again to FIG. 5, similarly, an additional torque Tax may be taken into consideration in accordance with acceleration (deceleration) of the vehicle. The Tax may be also stored in the storage device of the ECU 17 in advance or may be calculated from an acceleration $G_x$. Needless to say, the calculation may be made by any data tables or any formulae.

To remove excessive fluctuations or undulations in the obtained demand torque value $T_{req}$, the corrected demand value may be passed through an appropriate low-pass filter (LPF). In place of or in addition to this measure, any upper limit may be set about the demand value in order not to apply excessive input to the actuator 27. For example, a maximum value $T_{etm\_Lim}$ may be set in advance and any smaller value in the calculated demand torque value and the maximum value $T_{etm\_Lim}$ can be used as the demand torque value $T_{req}$.

The calculation described above may be executed by the ECU 17 and/or by any discrete calculation circuit for which it could be formulated. For example, under control by the ECU 17, any external calculation circuit may carry out the aforementioned calculation.

Figure 6:
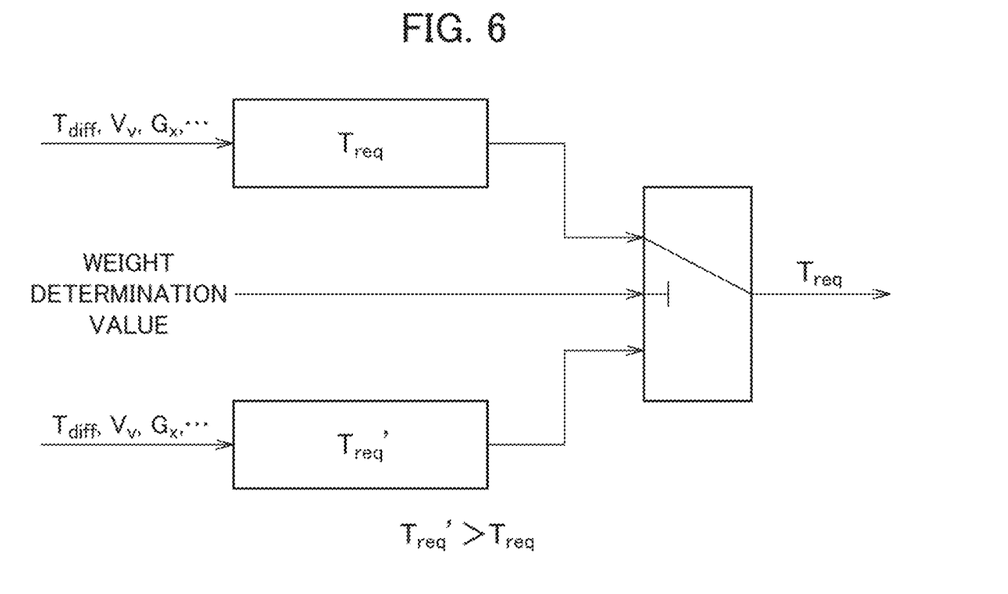
FIG. 6 is a diagram schematically showing one example of modifying settings on the basis of a load on the vehicle to make a calculation.

Referring to FIG. 6, in the present embodiment, correction is made to the demand torque value $T_{req}$ in accordance with the load applied to the driving wheels. For example, the demand torque value $T_{reg}$ according to an unloaded state may be corrected into a larger value $T_{reg}'$ in a case where heavy luggage is loaded on the trunk. The correction may include: comparing the load applied to the driving wheels with an appropriate threshold (weight determination value) set in advance and, according to its result, carrying out determination to select and use either $T_{req}$ or $T_{req}'$. When the load on the driving wheels is equal to or larger than a certain value, the larger value $T_{req}'$ may be used to increase the slip-limitation force for the differential 7.

As the value to be compared with the weight determination value, an output value detected by a load sensor and fetched by the ECU 17 via the bus 19 as described already may be available. Or, the load applied to the driving wheels may be estimated by calculation from other parameters and then used for the comparison. Output values by stroke sensors or such for example may be used for this calculation.

Calculation of the demand value $T_{req}'$ may be carried out in a similar way as the calculation of the value $T_{req}$, for example, and could be accompanied by addition of a certain correction value. Or, separately from a set of data tables for the unloaded state, a set of data tables for a heavily loaded state may be provided in advance, so that the former could be used for calculating the value $T_{req}$ when the wheel load is smaller than the threshold while the latter could be used for calculating the value $T_{req}'$ when the wheel load is larger than the threshold.

Or, when $T_{req}'$ is larger than the threshold, any one of the correction values $T_{LSD}$, $T_i$ and $T_{Gx}$, for example $T_i$, could be multiplied by a coefficient not less than 1 to obtain the demand value $T_{req}'$. Of course, as shown as an example in FIG. 7, the totality of $T_{req}$ may be multiplied by a coefficient not less than 1 to obtain the demand value.

Figure 8:
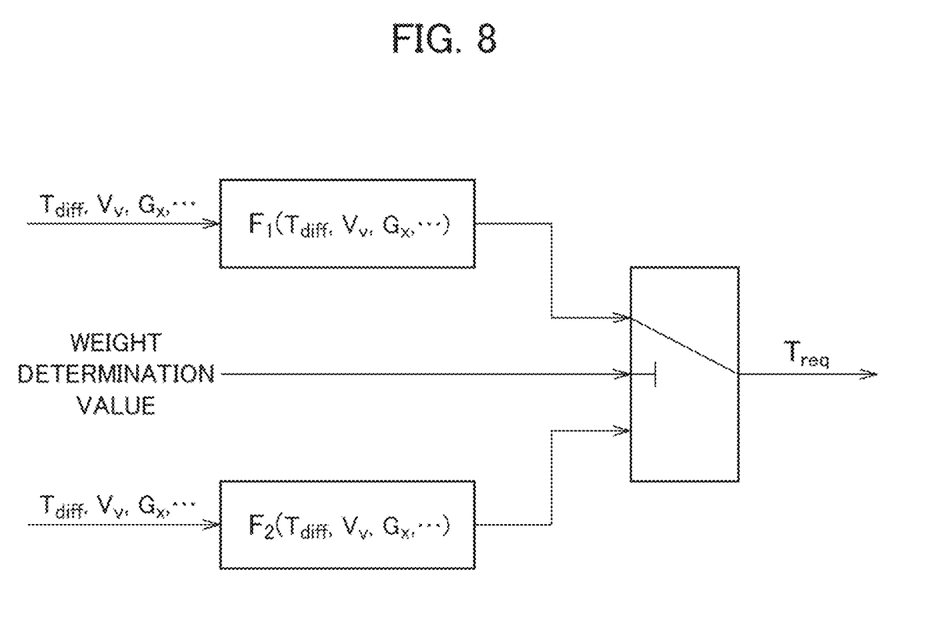
FIG. 8 is a diagram schematically showing another example of modifying settings on the basis of a load on the vehicle to make a calculation.

Alternatively, as shown as an example in FIG. 8, a formula $F_1$ for the unloaded state and a formula $F_2$ for the heavily loaded state may be provided in advance, and next the formula $F_1$ could be used for calculating the demand value when the wheel load is smaller than the threshold while the formula $F_2$ could be used for calculating the demand value when the wheel load is larger than the threshold.

Figure 7:
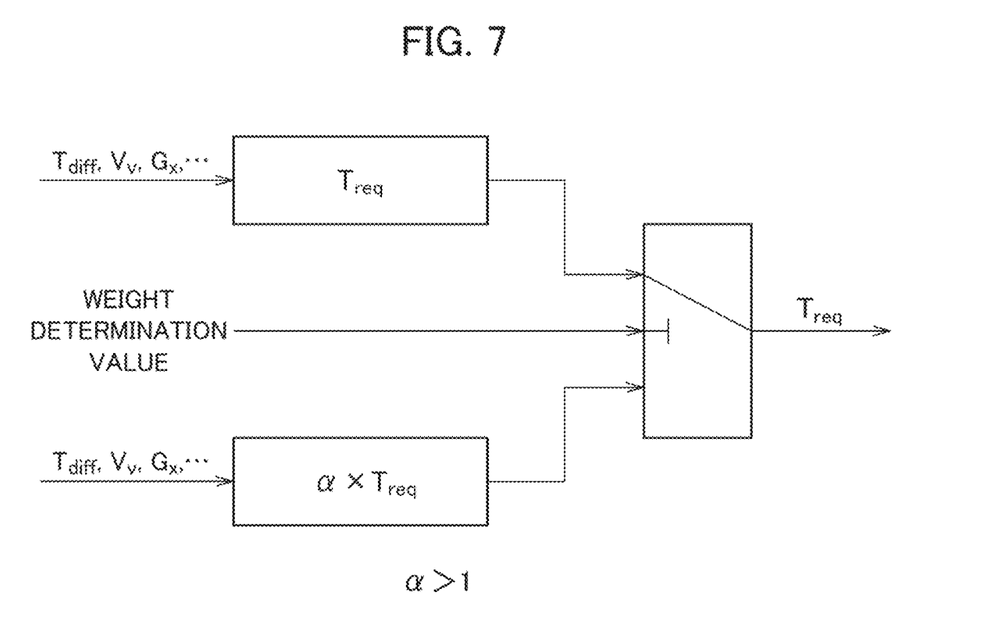
FIG. 7 is a diagram schematically showing an example of multiplication by a coefficient based on a load on the vehicle.

Still further alternatively, although the examples shown in FIGS. 6-8 relate to selection from two alternatives, three or more alternatives may be available for selection and then thresholds may not be limited to a single value but two or more separate thresholds may be available.

Figure 9A:
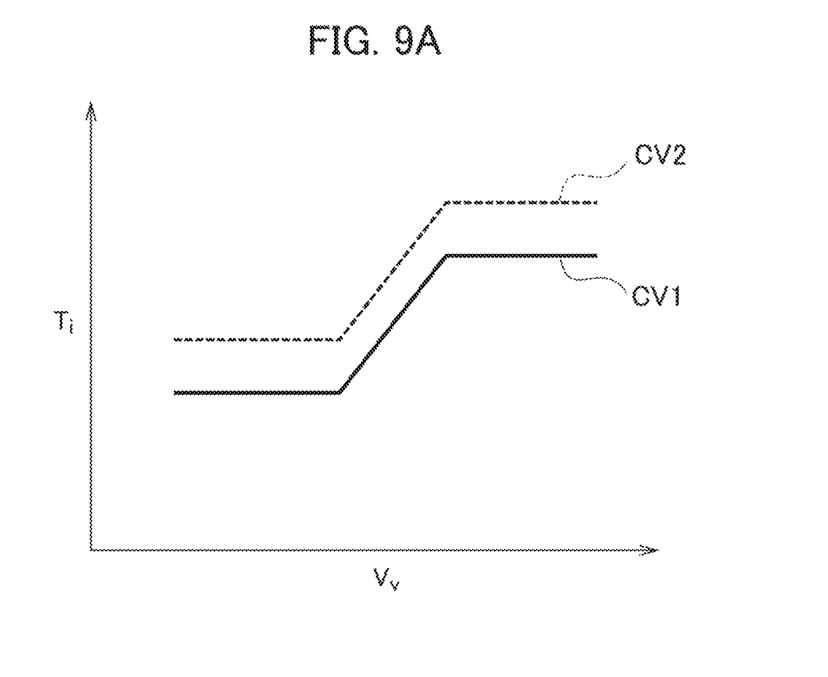
FIG. 9A is a graph schematically showing an example for selecting a correction value depending on a load on the vehicle.
Figure 9B:
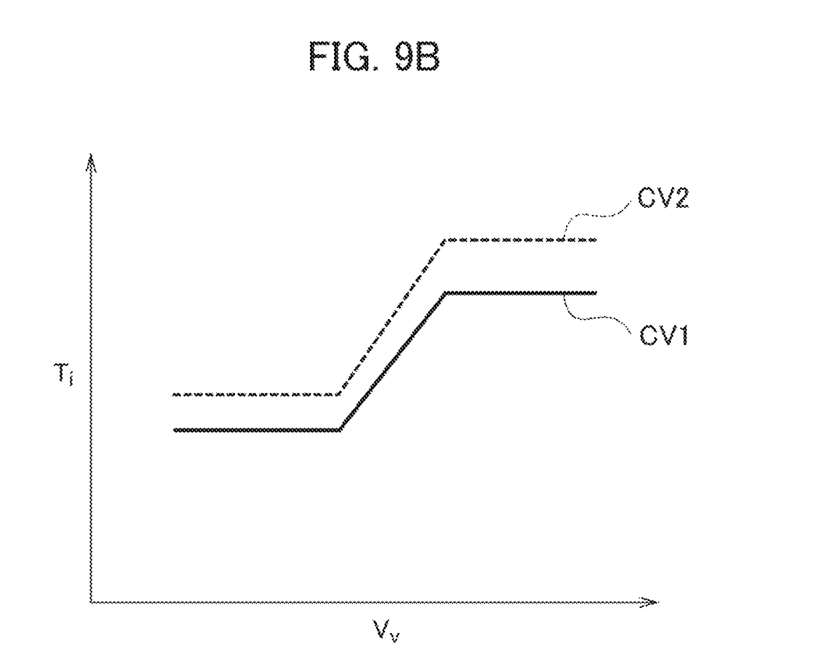
FIG. 9B is a graph schematically showing another example for selecting a correction value depending on a load on the vehicle.

Referring mainly to FIG. 9A, according to the present embodiment, a control is illustrated where the demand torque $T_{req}$ is decreased (CV1) when the load on the driving wheels is relatively small, but rather the demand torque $T_{req}$ is increased to intensify the slip-limitation force (CV2) when the load on the driving wheels is relatively large and therefore the grip limit of tires is high. Alternatively, as shown as an example in FIG. 9B, a control is illustrated where the demand torque is not intentionally changed in the low-speed area but large differences could be given in the high-speed area.

Figure 10:
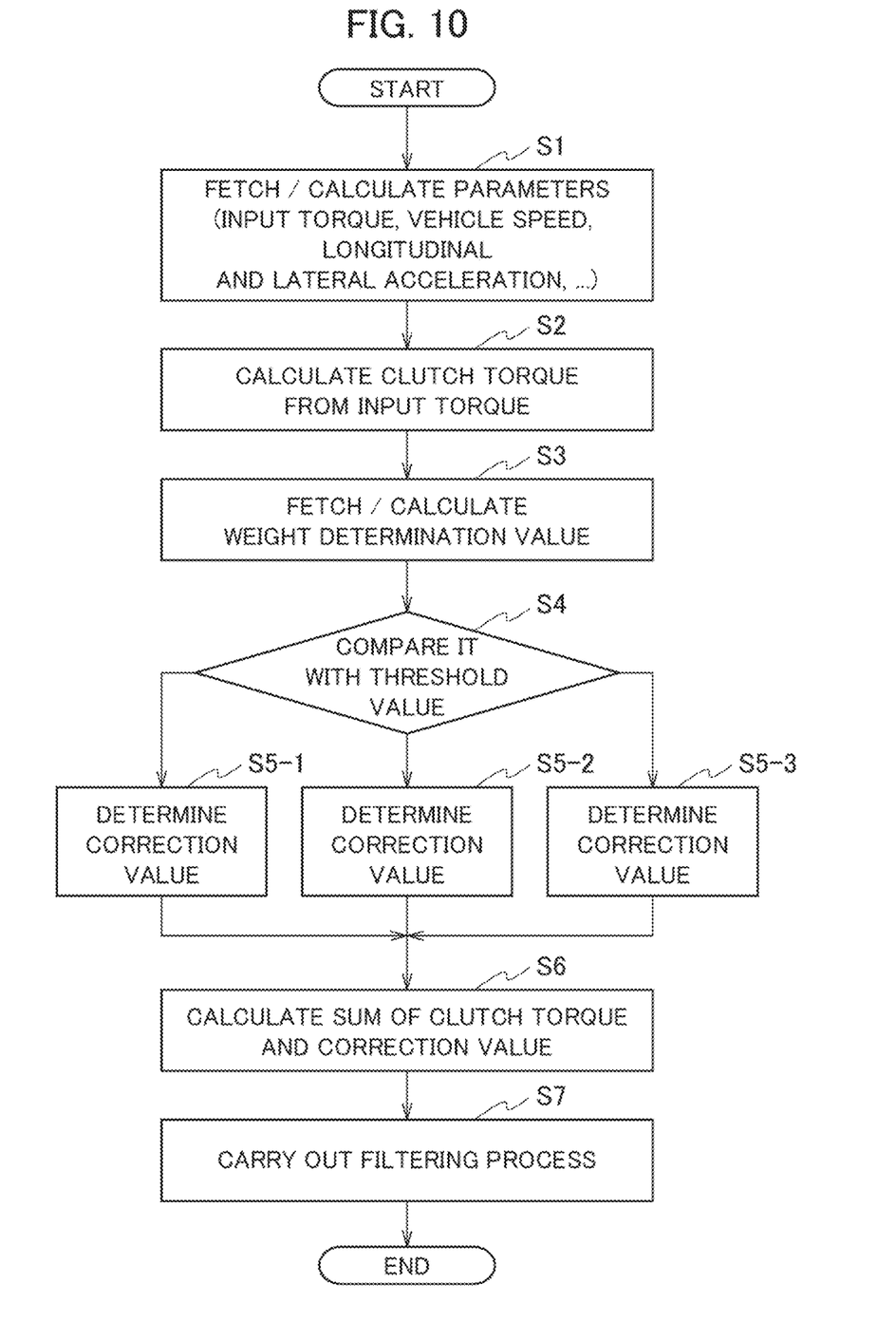
FIG. 10 is a flowchart of calculations and controls executed by an electronic control unit.

Steps of control by the ECU 17 will be described hereafter with reference to FIG. 10. The ECU 17 first uses the CAN communication or such to fetch or calculate parameters such as the input torque and the vehicle speed (S1). The ECU 17 next selects any data table stored in advance, or accords conditions provided in advance, to calculate the clutch torque (S2). If necessary, it calculates correction values and these coefficients for the initial torque, the additional torque and such.

Next it fetches or calculates the load applied to the driving wheels (weight determination value) (S3), and compares it with the threshold provided in advance to determine a way for correcting the clutch torque (any of S5-1, -2 and -3). Based on the determined way of correction, it makes a correction to the demand torque value to calculate the demand value (S6). If necessary, the calculated value is subject to a filter process or such to obtain a final demand value (S7).

Figure 11:
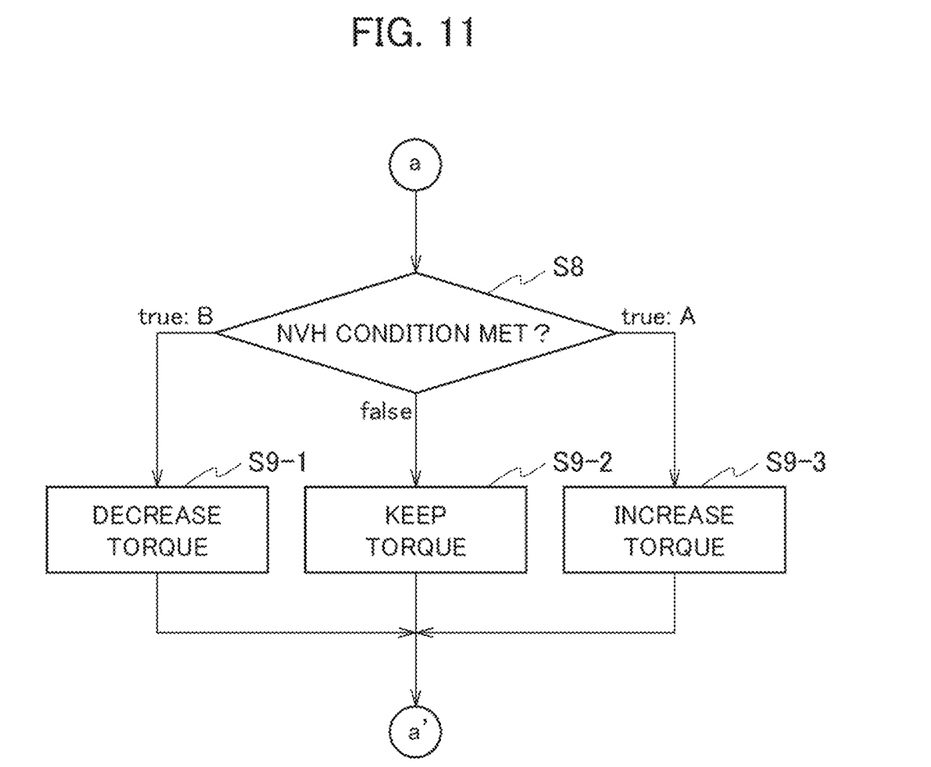
FIG. 11 is a flowchart for improving NVH.

Referring to FIG. 11, additional controls may be carried out. For example, when excessive differential motion occurs between the side gears 35R, 35L in the differential 7, or when an excessive fluctuation is created in the torque applied to the frictional clutch 25, noise, vibration or harshness (frequently referred to as "NVH", named after initials of the respective terms) often occur. Thus any control for preventing generation of NVH could be added. For example, any condition where the NVH could occur may be set in advance and the additional control may carry out to determine whether the condition is met or not (S8), keep the demand value in a case where the NVH would not occur (false) (S9-2), and decrease (S9-1) or increase (S9-3) the demand value in a case where the NVH would occur (true).

According to the obtained demand value, the ECU 17 applies electric power to the actuator to control the rotational angle of the rotary plate 41, thereby regulating the slip-limitation force. These steps are continuously repeated so that the slip-limitation force is dynamically regulated.

As will be understood from the descriptions heretofore, according to the present embodiment, settings are selected in accordance with the load applied to the driving wheels and the slip-limitation force is thereby optimized irrespective of the condition of the vehicle. For example, it enables a control mainly focusing on turning performance when the load is relatively small, and also enables a control mainly focusing on traction force when the load is relatively large. The present embodiment embodies optimum controls no matter how the conditions of the vehicle are.

Although certain exemplary embodiments are described above, modifications and variations of the embodiments will occur to those skilled in the art, in light of the above teachings.

What is claimed is:

1. A differential for distributing an input torque to a pair of output shafts depending at least on the input torque and a wheel load, the differential comprising:
a casing receiving the input torque;
a differential gear set housed in and supported by the casing, the differential gear set including first and second side gears respectively connected to the output shafts to differentially distribute the input torque to the first and second side gears;
a clutch interposed between the casing and the first side gear and configured to exert a frictional braking force on the first side gear against the casing to limit a differential motion between the first side gear and the second side gear;
an actuator configured to apply a pressing force to the clutch to control the differential motion; and
an electronic control unit electrically connected to the actuator and including a storage device storing at least one threshold value, the electronic control unit configured to calculate a demand torque value from the input torque, compare the wheel load with the threshold value to determine a correction value, make a correction in the demand torque value by the correction value to obtain a demand value, and control an electric power supplied to the actuator in response to the demand value.

2. The differential of claim 1, wherein the storage device is configured to add the correction value to the demand torque value to obtain the demand value when the wheel load is larger than the threshold value.

3. The differential of claim 1, wherein the correction value includes a vehicle speed correction value and the electronic control unit is configured to multiply the vehicle speed correction value by a coefficient not less than 1 to obtain the demand value when the wheel load is larger than the threshold value.

4. The differential of claim 3, wherein the storage device stores a vehicle speed data table and the electronic control unit is configured to compare a vehicle speed with the vehicle speed data table to obtain the vehicle speed correction value.

5. The differential of claim 1, wherein the storage device stores two or more vehicle speed data tables and the electronic control unit is configured to select one of the vehicle speed data tables in response to comparison of the wheel load with the threshold value, calculate a vehicle speed correction value from a vehicle speed and the selected vehicle speed data table, and add the vehicle speed correction value with the demand torque value to obtain the demand value.

6. The differential of claim 2, wherein the electronic control unit is connected to other electronic control units via a network and configured to calculate the vehicle speed, the input torque and the wheel load from data received via the network.

* * * * *